(12) United States Patent
Herchen et al.

(10) Patent No.: US 7,567,885 B2
(45) Date of Patent: Jul. 28, 2009

(54) METHOD AND SYSTEM FOR DETERMINING OBJECT HEIGHT

(75) Inventors: Harald Herchen, Los Altos, CA (US); Kim Vellore, San Jose, CA (US); Erica Renee Porras, Los Gatos, CA (US)

(73) Assignee: Sokudo Co., Ltd., Kyoto (JP)

( * ) Notice: Subject to any disclaimer, the term of this patent is extended or adjusted under 35 U.S.C. 154(b) by 16 days.

(21) Appl. No.: 11/843,978

(22) Filed: Aug. 23, 2007

(65) Prior Publication Data

US 2009/0055124 A1    Feb. 26, 2009

(51) Int. Cl.
G06F 19/00    (2006.01)
(52) U.S. Cl. ...................... 702/166; 702/155
(58) Field of Classification Search .............. 702/97, 702/162, 166, 167, 168, 155; 33/504
See application file for complete search history.

(56) References Cited

U.S. PATENT DOCUMENTS

| | | | |
|---|---|---|---|
| 6,000,281 A | * | 12/1999 | Burke .................... 73/105 |
| 6,196,061 B1 | * | 3/2001 | Adderton et al. ............. 73/105 |
| 6,407,858 B1 | | 6/2002 | Montagu |
| 6,633,831 B2 | * | 10/2003 | Nikoonahad et al. ........ 702/155 |
| 2006/0013453 A1 | | 1/2006 | Schneider et al. |
| 2006/0130767 A1 | | 6/2006 | Herchen |

* cited by examiner

*Primary Examiner*—Edward R Cosimano
*Assistant Examiner*—Douglas N Washburn
(74) *Attorney, Agent, or Firm*—Townsend and Townsend and Crew LLP (57) ABSTRACT

An apparatus and method for measuring a height of an object above a surface includes a housing with a first portion having an upper surface and a lower surface and an extension portion extending a first distance from the lower surface of the first portion. The extension portion defines a cavity opposing the lower surface of the first portion. The apparatus further includes one or more actuators passing through the lower surface of the first portion of the housing and extending into the cavity. Additionally, the apparatus includes a plate supported by one or more flexible members coupled to the extension portion. The plate has a top surface and a bottom surface that lies in a plane substantially parallel to the surface. Moreover, the apparatus includes a plurality of sensors disposed at predetermined positions of the plate. Each of the plurality of sensors is responsive to a height measured between each of the plurality of sensors and the surface.

24 Claims, 7 Drawing Sheets

Fig. 1

Top view of XX' section plane

METHOD AND SYSTEM FOR DETERMINING OBJECT HEIGHT

BACKGROUND OF THE INVENTION

The present invention relates generally to the field of substrate processing equipment. More particularly, the present invention relates to a method and system for determining a height of an object on a surface. Merely by way of example, the method and system of the present invention have been applied to accurately determining z-height of an object with a rounded top, such as the proximity pin on a chuck for supporting a substrate in a processing tool. But it would be recognized that the invention has a much broader range of applicability.

Substrate support structures or chucks are widely used to support substrates within semiconductor processing systems. These chucks are used to retain semiconductor wafers or other work-pieces in a stationary position during processing. Two examples of particular types of chucks used in semiconductor processing systems include electrostatic chucks (e-chucks) and vacuum chucks.

One potential problem with such chucks is that if a substrate is loaded directly onto the upper surface of the chuck during substrate processing, the chuck surface can abrade the material present on the backside of the substrate, resulting in the introduction of particulate contaminants to the process environment. The particulate contaminants can adhere to the backside of another substrate and be carried to other process environment or cause defects in the circuitry fabricated upon the substrate. As the semiconductor device geometry has become smaller with each generation of ICs, these particulate contaminants can cause a loss in yield as well as degradation of device characteristics and reliability.

One method of reducing the number of particles generated on the backside of the substrate is to reduce the contact area between the substrate and the surface of the chuck. This can be accomplished by, for example, using an array of proximity pins or support members that space the substrate at a predetermined distance from the surface of the chuck.

Proximity pins can be installed by various methods. One known method, for example, is to form a plurality of recessed regions in the surface of the plate assembly and provide a plurality of support members with rounded shape having a diameter larger than the width of the recessed regions. Then the support members are pressed into the recessed regions to be placed into position.

An array of proximity pins manufactured in the manner described above will generally need to be characterized to ensure that each proximity pin has a height within a specification for the proximity pins. Conventional characterization processes use height measurement gauges to measure the height of protrusions on a surface. However, these height measurement gauges are not generally able to measure objects with rounded top surfaces. Additionally, height measurement gauges do not provide the resolution appropriate for some proximity pin applications. Therefore, there is a need in the art for improved techniques for measuring a height of an object on a surface.

SUMMARY OF THE INVENTION

Embodiments of the present invention relate generally to the field of substrate processing equipment. More particularly, the present invention relates to a method and system for determining a height of an object on a surface. Merely by way of example, the method and system of the present invention have been applied to accurately determining z-height of an object with a rounded top, such as the proximity pin on a chuck for supporting a substrate in a processing tool. But it would be recognized that the invention has a much broader range of applicability.

According to an embodiment of the present invention, an apparatus for measuring a height of an object above a surface is provided. The apparatus includes a housing which includes a first portion having an upper surface and a lower surface and an extension portion extending a first distance from the lower surface of the first portion, whereby the extension portion defines a cavity opposing the lower surface of the first portion. The apparatus further includes one or more actuators passing through the lower surface of the first portion of the housing and extending into the cavity and one or more flexible members coupled to the extension portion. Additionally, the apparatus includes a plate having a top surface and a bottom surface, which is coupled to the one or more flexible members and disposed in the cavity. The plate is supported by the one or more flexible members to lie in a plane substantially parallel to the surface. Moreover, the apparatus includes a plurality of sensors disposed at predetermined positions of the plate. Each of the plurality of sensors is responsive to a height measured between each of the plurality of sensors and the surface.

In a specific embodiment, the plurality of sensors on the plate includes at least three sensors positioned with a predetermined distance between each of the three sensors. Each of the three sensors are disposed in a peripheral portion of the plate to form a triangle. The plurality of sensors can be capacitive sensors for measuring spatial distances.

In another specific embodiment, the apparatus further includes a number of spring members coupled to each of the one or more actuators and vertical motion of the one or more actuators is constrained by the spring members. The vertical motion of the one or more actuators is operable to bring the bottom surface of the plate into contact with the object and to tilt the plate into a first orientation characterized by a positioning of each of the plurality of sensors in a first measurement position. The vertical motion of the one or more actuators is also operable to tilt the plate into a second orientation characterized by a positioning of each of the plurality of sensors in a second measurement position. In one embodiment, the first orientation includes at least a rotational component orthogonal to the second orientation.

According to an alternative embodiment of the present invention, a system for determining an object height on a surface is provided. The system includes a height measurement apparatus. In one embodiment, the height measurement apparatus includes a housing which includes a first portion having an upper surface and a lower surface and an extension portion extending a first distance from the lower surface of the first portion, where the extension portion defines a cavity opposing the lower surface of the first portion. The apparatus also includes one or more flexible members coupled to the extension portion of the housing and a plate (e.g., a silicon carbide plate) having a top surface and a bottom surface coupled to the one or more flexible members and disposed in the cavity to lie in a plane substantially parallel to the surface. Additionally, the apparatus includes one or more actuators disposed passing through the lower surface of the first portion of the housing into the cavity and capable of engaging the top surface of the plate. The apparatus further includes a plurality of sensors disposed at predetermined positions of the plate. Each of the plurality of sensors is responsive to a height measured between each of the plurality of sensors and the surface. According to a specific embodiment, the apparatus additionally includes a power supply coupled to the one or more actuators and a wireless receiver coupled to the power supply. In a particular embodiment, the wireless receiver is configured to receive control signals for driving the one or more actuators to perform at least vertical motion.

The system for determining an object height on a surface additionally includes a controller coupled to the height measurement apparatus and configured to send control signals to the one or more actuators and receive a plurality of height measurements from each of the plurality of sensors. Furthermore, the system includes a computer coupled to the controller and configured to process the plurality of height measurements from each of the plurality of sensors and compute the object height on the surface.

According to yet another alternative embodiment of the present invention, a method of determining a height of an object on a surface is provided. The method includes steps of identifying an object on the surface and engaging a plate to make contact between a lower surface of the plate and the object. The plate is supported by one or more flexible members to lie in a plane substantially parallel to the surface and the one or more flexible members is coupled to a housing. The plate further includes a plurality of sensors disposed at predetermined positions. Each of the plurality of sensors is responsive to a height measured between the each of the plurality of sensors and the surface. The method further includes tilting the plate relative to a first rotational axis while maintaining contact between the lower surface and the object and collecting a first plurality of height data. Additionally, the method includes tilting the plate relative to a second rotational axis which includes at least a component orthogonal to the first rotational axis while maintaining contact between the lower surface and the object and collecting a second plurality of height data. Moreover, the method includes processing an information associated with the first plurality of height data and the second plurality of height data in conjunction with the predetermined positions of the plurality of sensors. The method further includes determining a location of the object relative to the plate. Furthermore, the method includes calculating the height of the object based on at least the location of the object and at least the first plurality of height data.

Many benefits are achieved by way of the present invention over conventional techniques. For example, embodiments of the present invention provide a height measurement apparatus utilizing three height sensors positioned to form a triangle to determine the plane of a plate joining the height sensors. Certain embodiments of the present invention allow height data to be taken independently by the height sensors in at least two arbitrarily orthogonal orientations while relaxing the requirement to keep the plate parallel to the base surface during measurement. Depending upon the embodiment, one or more of these benefits, as well as other benefits, may be achieved. These and other benefits will be described in more detail throughout the present specification and more particularly below in conjunction with the following drawings.

DETAILED DESCRIPTION OF SPECIFIC EMBODIMENTS

Figure 1:
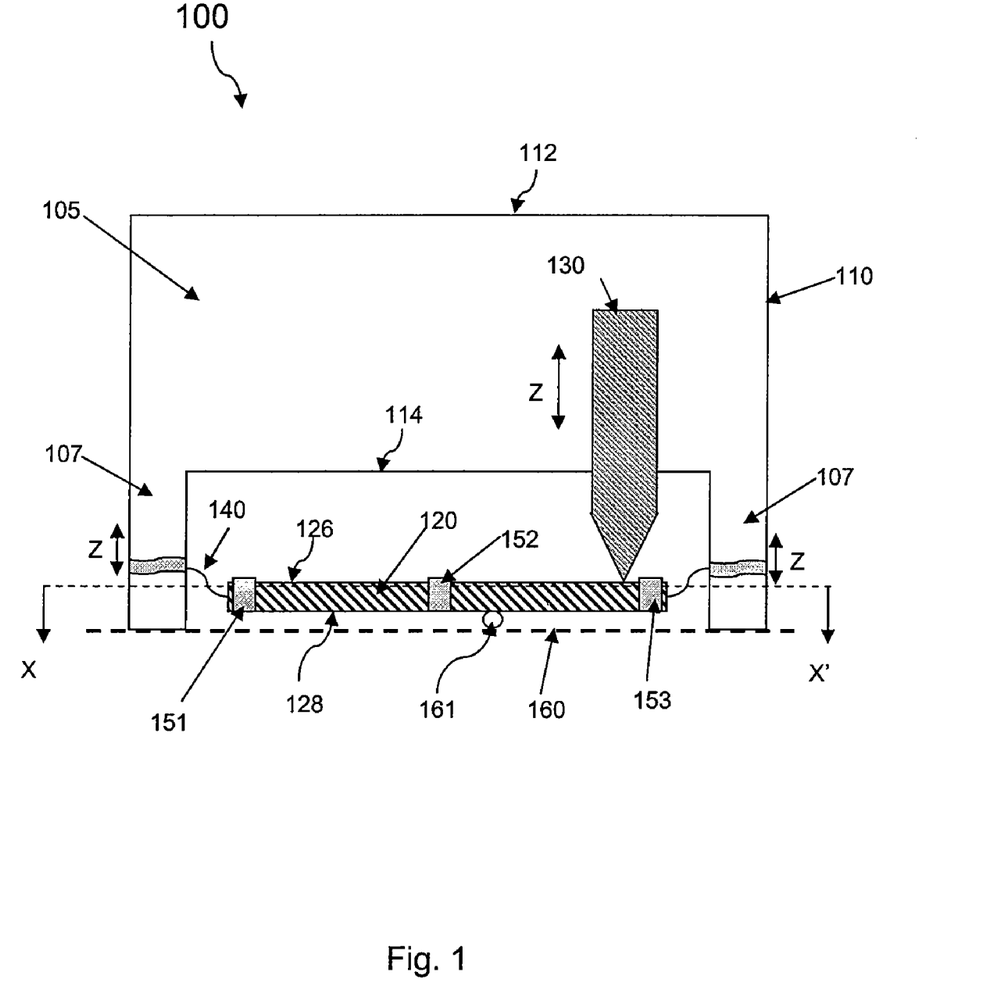
FIG. 1 is a simplified schematic side view illustration of an apparatus for obtaining an object height on a surface according to an embodiment of the present invention.

FIG. 1 is a simplified schematic side view illustration of an apparatus for obtaining an object height on a surface according to an embodiment of the present invention. This diagram is merely an illustration and should not limit the scope of the claims herein. As shown, the apparatus 100 is placed on a surface 160 for measuring a height of an object 161 on the surface. As will be evident to one of skill in the art, the object 161 is not part of the apparatus 100, but is illustrated to demonstrate use the apparatus 100 according to embodiments of the present invention. The apparatus 100 includes a housing 110 which has a first portion 105 and an extension portion 107. The first portion 105 has an upper surface 112 and a lower surface 114. The extension portion 107 is extended from the peripheral region of the lower surface 114 of the first portion, which provides support for the housing body and creates a cavity or a recessed region that is opposed to the lower surface of the first portion. A plate 120, is disposed in the cavity and the peripheral side of the plate is coupled to the inner side of the extension portion 107 using one or more flexible members 140. The plate 120 is made of a hard material, for example, silicon carbide, and has a top surface 126 and a flat bottom surface 128. In an embodiment, the bottom surface is characterized by a flatness or surface roughness of typically 0.5 microns Ra, but no greater than 5 microns Ra. As described throughout the present specification and more particularly below, the plate 120, incorporates certain height sensors, making it useful as a measurement tool to obtain a height of an object on a surface.

In a particular embodiment, the coupling of the one or more flexible members is configured in such a way that, as the apparatus is placed on a surface 160 of a work piece that has no local object or protrusion on the surface, the plate 120, suspended by the one or more flexible members 140, would have its bottom surface substantially parallel to the surface while still being able to tilt to a certain degree. For example, the plate under this free suspension state, may be slightly tilted one way or another within an angle less than 0.2° relative to the surface. In another example, the extension portion 107, or particularly the portion that is coupled to the one or more flexible member 140, may be vertically adjustable (in the z-direction) so that the bottom surface 128 of the plate 120 in the free suspension state, may be adjusted to be substantially flush with the bottom of the extension portion 107. In the free suspension state, the stiffness of the one or more flexible members is sufficient to support the weight of the plate.

In another particular embodiment, the one or more flexible members are configured in such a way that, as the apparatus is placed on a surface 160 with a local object or protrusion 161 to be measured, the plate 140 can make contact both with the object 161 and at one location of the bottom surface 128 of the plate 120. Depending on the height of the object 161 to be measured (assuming the height is within the designed measurable range for the apparatus), the extension portion 107 may be adjusted or pre-adjusted through a calibration procedure so that the one or more flexible members 140 support the plate 120 while the plate is in contact with the object or protrusion 161 and the bottom surface 128.

Referring to FIG. 1 again, the first portion 105 of the housing 110 includes at least an actuator 130. The actuator 130 has a body extending above the lower surface 114 of the first portion 105 and is configured to move vertically in the z-direction. In a specific embodiment, the actuator 130 is capable of having its lower end make contact with the top surface 126 at a position near the edge of the plate 120 in order to push the edge of the plate down. In an alternative embodiment, the actuator 130 may be configured to move laterally so that it can be positioned above a desired location above the plate 120 prior to subsequent vertical motion. In another alternative embodiment, there can be more than one actuator installed at certain locations as appropriate to the particular shape/size of the plate. Each of these actuators may be able to move both vertically and laterally. In an embodiment, the actuator 130 is made of a piezoelectric material coupled to a power supply to provide driving voltage for extension or contraction. In another example, the actuator 130 can be a MEMS device, an electromagnetic stepping motor, or the like. In yet another example, the actuator 130 may be coupled to a wireless receiver (not shown) capable of receiving control signals from a remote controller. Of course, there can be other alternatives, variations, and modifications.

In addition, the apparatus 100 also includes a plurality of height sensors that are installed at predetermined positions on the plate 120. As shown in FIG. 1, at least three height sensors 151, 152, and 153 are mounted on the plate 120. Each of the height sensors are capable of sensing the height of each sensor relative to the surface and providing height data corresponding to their measurement positions. The height sensors are capable of providing such data at various orientations including parallel to surface 160 and at various tilt angles with respect to surface 160. For example, the height sensors may be capacitive sensors that measure the spatial distance between two charged planes by determining the capacitance in such a configuration.

In one embodiment, the height sensors are positioned in a first measurement position with the plate 120 tilted in a first orientation. In this first orientation, one edge of the plate is pushed down by the actuator 130 until the edge touches the surface. Subsequently, the height sensors are positioned in a second measurement position with the plate 120 tilted in a second orientation. In this second orientation, another edge of the plate is pushed down by the actuator 130 until that edge touches the surface. Of course, there can be other alternatives, variations, and modifications.

Referring to FIG. 1 again, the plate 120 is supported by the one or more flexible members 140 and disposed within the cavity or recessed region below the lower surface 114 of the first portion 105 of the housing and between the inner sides of extension portion 107. In one embodiment, the shape/size of the plate is adapted to the space allowed by the cavity such that there is a spacing between the peripheral side of the plate and the inner side of the extension portion. Depending on the application, the body structure of the housing 110 and its extension portion 107 may have various shapes and/or lateral sizes. Correspondingly, the shape/size of the plate 120 can be varied. In another embodiment, the size or dimension of the plate in a certain direction may be selected in view of a desired height measurement accuracy depending on the designed measurement range for the apparatus.

Figure 2:
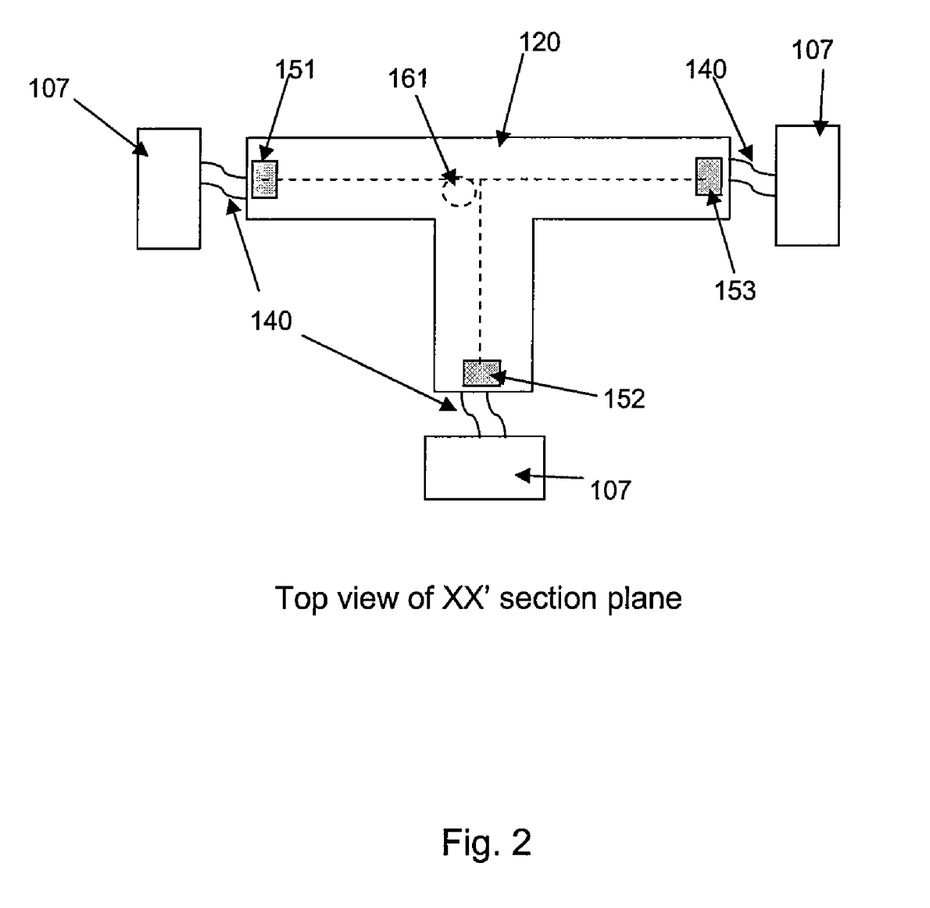
FIG. 2 is a simplified schematic cross-section view taken through plane XX' of FIG. 1 according to an embodiment of the present invention.

FIG. 2 is a simplified schematic cross-section view taken through plane XX' of FIG. 1 according to an embodiment of the present invention. This diagram is merely an illustration and should not limit the scope of the claims herein. As shown, a T-shaped plate is supported at its three ends by corresponding flexible members coupled to the inner sides of extension portion 107 of the housing. Here, the extension portion 107 is illustrated as three separate parts. Of course, there can be other alternatives such as four parts, or a single round part, or the like, supporting the housing body. Further, the plate includes three height sensors denoted as 151, 152, and 153. In a specific embodiment, each of the three height sensors is positioned in a predetermined position such that there is a known separation between each of the height sensors. For example, as illustrated in FIG. 2, the sensors 151, 152, and 153 are disposed near the three ends of the T-shaped plate 120.

In one specific embodiment, the positions of above three sensors 151, 152, and 153 form a triangle with an equal distance between each sensor and the middle point A of a line section connecting the sensor 151 and the sensor 153. In another embodiment, three flexible members 140, denoted by undulating lines, are located between the peripheral side of the three ends of the T-shaped plate and a corresponding extension portion 107. For example, the flexible member 140 may be a kind of elastic material (e.g., rubber). In another example, the flexible member 140 is a diaphragm membrane. Of course, there can be other alternatives, variations, and modifications.

Figure 3A:
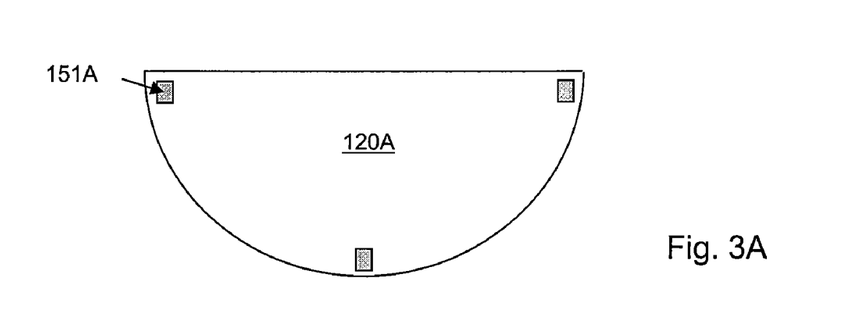
FIGS. 3A-3D are simplified top view diagrams illustrating plates with different shapes according to alternative embodiments of the present invention.
Figure 3B:
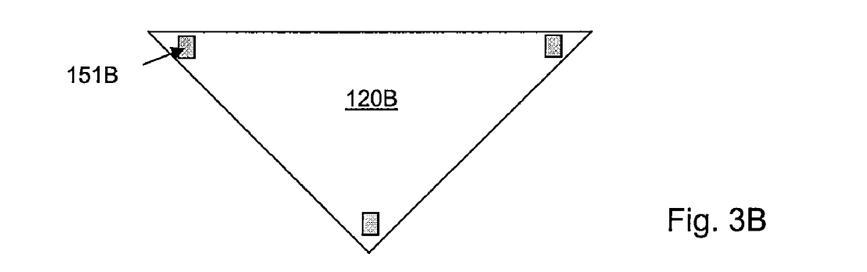
Figure 3C:
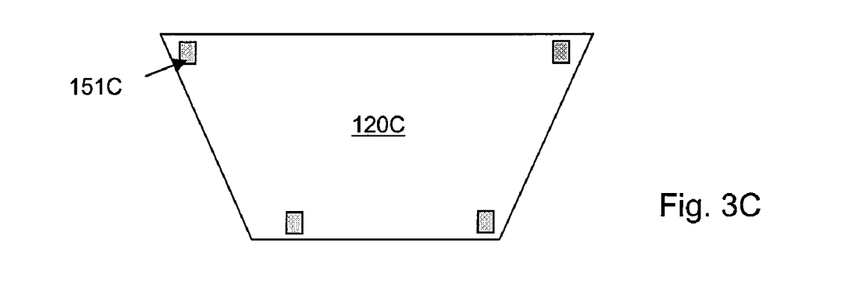
Figure 3D:
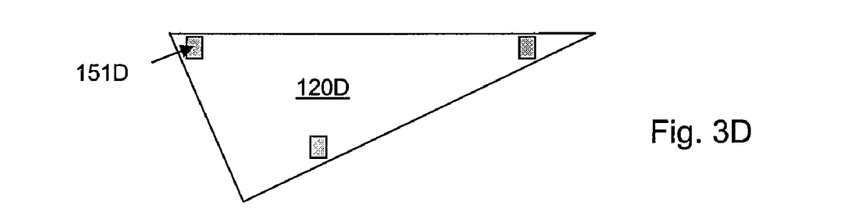

In some embodiments, the invention does not impose a particular limit on the choice of the shape for the plate 120. FIGS. 3A-3D are simplified top view diagrams illustrating plates with different shapes according to alternative embodiments of the present invention. These diagrams are merely an illustration and should not limit the scope of the claims herein. As shown in FIG. 3A, the plate 120A has a hemispherical or fan-shaped body. Three height sensors are positioned along the periphery of the plate 120A. Similarly, FIG. 3B shows a symmetric triangular shaped plate 120B with three sensors mounted on three corners. FIG. 3C shows a trapezoidal shaped plate 120C with four sensors placed near the four corners of the trapezoid. FIG. 3D shows a non-symmetric triangular shape that may be employed for the plate 120D and three sensors spaced apart from each other while not necessarily near any corner of the shape. Of course, there can be other alternatives, variations, and modifications. It will be appreciated that the particular shape of the plate and the particular setup of the sensor positions will affect the computations used for deriving the height of the object measured using embodiments of the present invention.

Figure 4A:
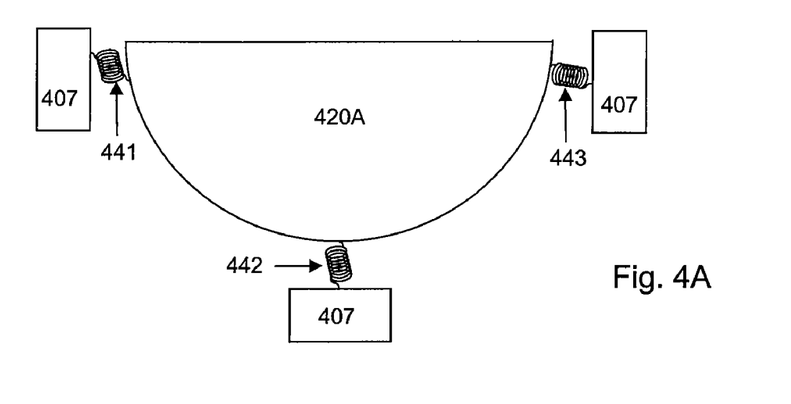
FIG. 4A is a simplified diagram illustrating a shaped plate supported by a plurality of springs coupled to the housing according to an alternative embodiment of the present invention.
Figure 4B:
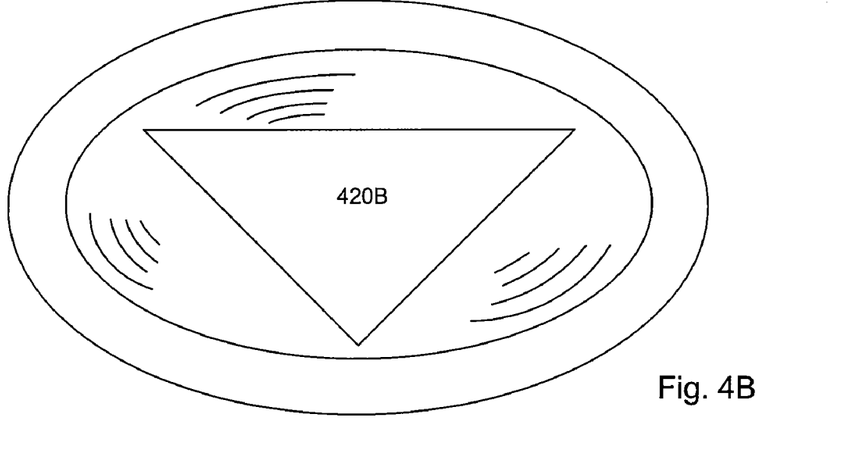
FIG. 4B is a simplified diagram illustrating a shaped plate supported by a flexible diaphragm membrane coupled to the housing according to an alternative embodiment of the present invention.
Figure 4C:
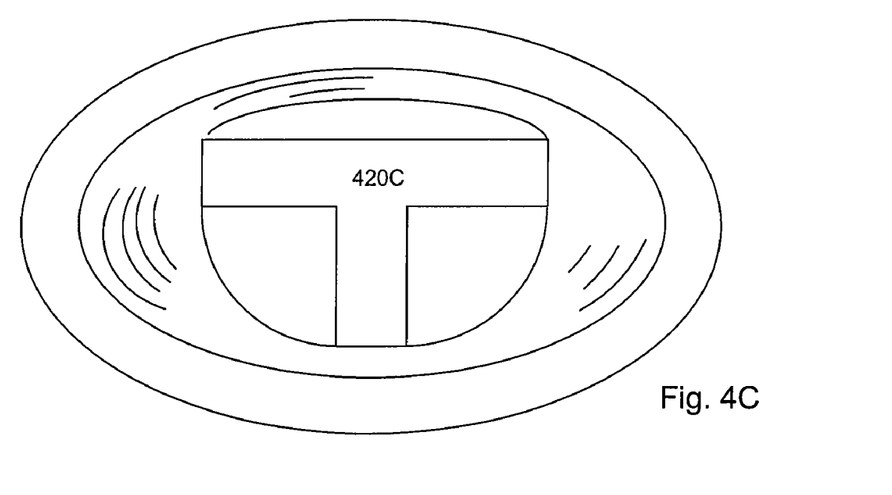
FIG. 4C is a simplified diagram illustrating a T-shaped plate supported by a diaphragm membrane coupling only the three end-sections of the plate according to an alternative embodiment of the present invention.

In an embodiment, the flexible members coupling the plate to the extension portion of the housing can be provided in various configurations. FIG. 4A is a simplified diagram illustrating a shaped plate supported by a plurality of springs coupled to the housing according to an alternative embodiment of the present invention. As shown, three springs 441, 442, and 443 each couple one edge of the hemispherical plate 420 to the extension portion 407 of the housing. FIG. 4B is a simplified diagram illustrating a shaped plate supported by a flexible diaphragm membrane coupled to the housing according to an alternative embodiment of the present invention. As shown, the diaphragm membrane 440B connects between entire edge surrounding the triangular shaped plate 420B to the entire inner side of the rounded extension portion 407B. FIG. 4C is a simplified diagram illustrating a T-shaped plate supported by a diaphragm membrane coupling only the three end-sections of the plate according to an alternative embodiment of the present invention. These diagrams are merely an example, which should not unduly limit the scope of the claims herein. One of ordinary skill in the art would recognize other variations, modifications, and alternatives.

Figure 5A:
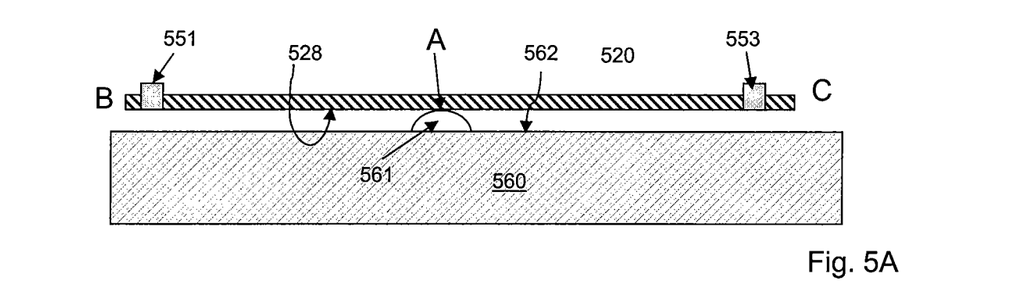
FIGS. 5A-5C are simplified diagrams illustrating a 2D side view of a plate making contact with an object on a surface and titling during height measurement according to an embodiment of the present invention.
Figure 5B:
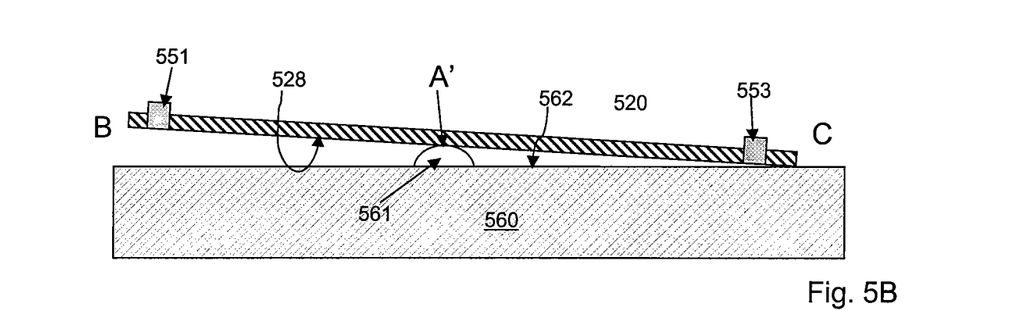
Figure 5C:
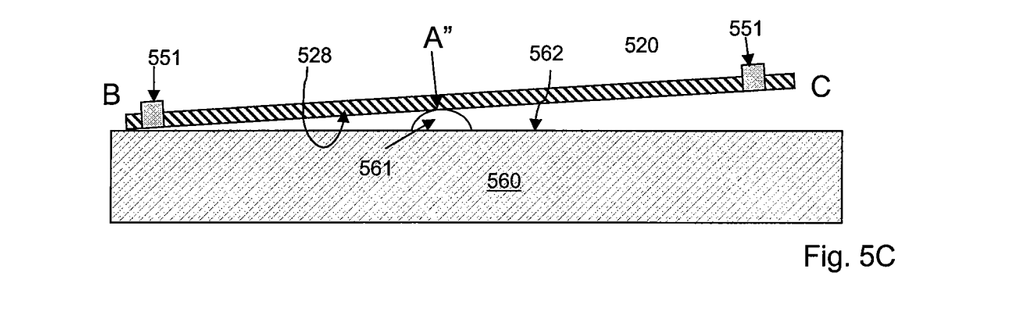

FIGS. 5A-5C are simplified diagrams illustrating a 2D side view of a plate making contact with an object on a surface and titling during height measurement according to an embodiment of the present invention. These diagrams are merely an example, which should not unduly limit the scope of the claims herein. One of ordinary skill in the art would recognize other variations, modifications, and alternatives. FIG. 5A illustrates any initial state when an measurement plate 520 is brought in contact with an object 561 on a surface 562 of a work piece 560. For example, the workpiece may be a vacuum chuck or electrostatic chuck and the object 561 may be one of a number of proximity pins used for supporting wafers or substrates at a predetermined height above the workpiece. In various embodiments, the workpiece is a flat plate fabricated from stainless steel, silicon carbide, copper, graphite, aluminum, aluminum nitride, aluminum oxide, boron nitride, combinations/laminations of these materials, and the like. As shown, the object 561 has a rounded top surface. For example, the proximity pin may be made of a sapphire sphere with a radius of about 0.25 mm. The plate 520 makes contact between its bottom surface 528 and the object 561 at a contact point A. The plate 520 includes two height sensors 551 and 553 near both ends B and C, which are spaced apart with a known separation. In a specific embodiment, the known separation between the two sensors is large in comparison with the height of the object to be measured. For example, the separation between sensor 551 and 553 is about 28 mm or larger compared with the proximity pin height of about several to hundreds of microns. Of course, there can be other alternatives, variations, and modifications.

FIGS. 5B and 5C each represent a specific measurement configuration in which the plate is tilted with respect to a horizontal orientation. FIG. 5B shows the plate 520 in an orientation in which the plate is tilted with its C end lowered to touch the surface 562 of the workpiece while maintaining contact at a point A' between the bottom surface 528 and the object 561. In this configuration, the sensors 551 and 553 each collect their own height data relative to the surface. For example, the height between the sensor 551 on the plate and the surface 562 directly under the sensor 551 is obtained by measuring the local capacitance in the illustrated configuration.

In an alternative configuration, FIG. 5C shows the B end of the plate 520 lowered to touch the surface 562 of the workpiece while maintaining contact at a point A" between the bottom surface 528 and the object 561. Theoretically, because of the finite radius of curvature of the object 561, the contact point A' or A" should have a lower height relative to the surface 562 compared to the height of the initial contact point A. However, since the dimension of the plate in embodiments is several orders of magnitude larger than the height of the object and the object 561 is generally centered on the plate (i.e., A is not close to either end B or C), the tilting angle for the configurations shown in either FIG. 5B or 5C is small. Therefore, to a first approximation, the height of contact point A, A', or A" can be considered to be equal. By taking the known separation between the sensors 551 and 553 and the two sets of height data measured at the two tilt configurations, the distances from the contact point A to sensors 551 and 553 can be calculated. Further, the height of the object, i.e., the height at the contact location A, can then be derived.

Now considering the three-dimensional case, the object to be measured may be in an arbitrary location other than coincident with a line connecting two of the height sensors and the measurement plate may be tilted in different orientations relative to different rotational axes. In this scenario, at least a third sensor disposed at a predetermined location is utilized so that the three sensors with known spatial separation between each other form a triangular configuration. Extending the concept of the method of obtaining the height of an object illustrated for the 2-dimensional scenario above, a method of obtaining the height of an object for a 3-dimensional case can be outlined as below.

Figure 6:
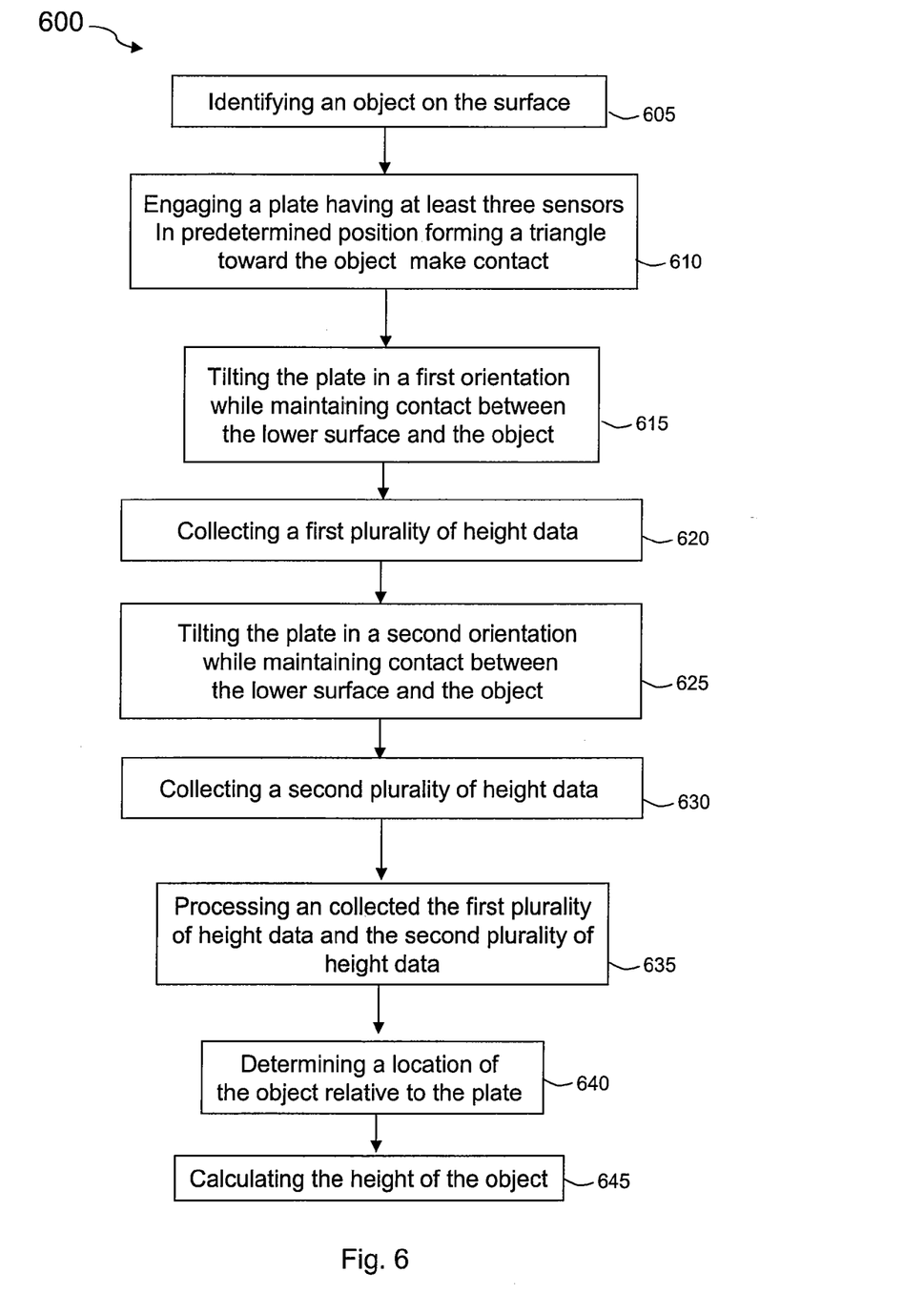
FIG. 6 is a simplified flow chart illustrating a method of measuring the height of an object on a surface according to an embodiment of the present invention.

FIG. 6 is a simplified flow chart illustrating a method of measuring the height of an object on a surface according to an embodiment of the present invention. The method includes identifying an object on a surface (605). The plate is engaged to make contact between a lower surface of the plate and the object (610). The plate includes at least three height sensors disposed on the plate with a predetermined spatial distance between each of the sensors, thereby forming a triangle. The plate is tilted relative to a first rotational axis while maintaining contact between the lower surface and the object (615). In the first tilted configuration, a first set of height data is collected from the height sensors (620).

The plate is then tilted relative to a second rotational axis while maintaining contact between the lower surface and the object (625). The second rotation axis has a component that is orthogonal to the first rotational axis. In the second tilted configuration, a second set of height data is collected from the height sensors (630). The first set of collected height data and the second set of collected height data is processed (635), the location of the object relative to the plate is determined (640), and the height of the object is calculated (645).

It should be appreciated that the specific steps illustrated in FIG. 6 provide a particular method of measuring the height of an object on a surface according to an embodiment of the present invention. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

For example, the plate as a measurement probe is the plate 120 of the apparatus 100 according to an embodiment of the invention. The plate is supported by one or more flexible members which are coupled to a housing. Before engaging the plate toward the object, the housing is positioned over the object to be measured. In one embodiment, the housing is placed directly on the surface in stable contact with an extension portion, so that that the object is located within a boundary defined by the extension portion. In an alternative embodiment, the housing may not be directly placed on the surface. In another alternative embodiment, the housing is configured to move laterally so that multiple objects on the surface can be measured one by one. Other techniques can move the surface laterally while the housing is fixed. Step 610 for engaging the plate to make contact with the object may be achieved by adjusting the extension portion of the housing or particularly adjusting the coupling position of the one or more flexible members on the extension portion. In one embodiment, as the plate makes contact with the object at a contact point, the one or more flexible members are stiff enough to support the plate in a plane substantially parallel to the surface.

In another embodiment, the location of the contact point relative to the plate is typically positioned near a middle point of the plate by properly positioning the housing, though it can have other alternatives and variations which should not unduly limit the scope of the claims herein. The location of the contact point is referred as the location of the object and the height at the contact point can be considered as the height of the object. In yet another embodiment, the plate includes at least three sensors disposed with predetermined spatial distances between each other to form a triangle. Each of the sensors is capable of sensing the height between the sensor and the surface at a corresponding measurement position. Such a configuration provides a degree of freedom for determining the location of the contact point, which could be in an arbitrary position on the plate relative to any sensor position.

At step 615, tilting of the plate may be performed by pushing one edge of the plate down. In one embodiment, one or more actuators configured to move vertically may be utilized, for example, actuator 130 as shown in FIG. 1. In a specific embodiment, the lower end of the actuator touches the top surface of the plate and further pushes it down so that the plate is tilted relative to a first rotational axis. It is assumed that the subjected object has a height substantially smaller than the dimension of the plate. Therefore, the plate is tilted by just a small angle with one edge of the plate touching the local surface while maintaining contact with the object. In a specific embodiment, the contact point after the tilting is substantially the same as the contact point before tilting. Now, the three sensors are in first measurement positions. Step 620 is then performed in an embodiment to collect a first set of height data from each of the three sensors. The first set of height data can be analyzed to fit a first plane which passes through the contact point of the object, based on the known position of each sensor on the plate.

Subsequently, step 625 is performed to tilt the plate relative to a second rotational axis while maintaining contact between the plate and the object. In a specific embodiment, the same actuator can be moved to a new location and is used to push another edge of the plate down until that edge touches the surface. Now, each of the sensors are in second measurement positions while the plate maintains contact with the object at substantially the same contact point. In another specific embodiment, the second rotational axis is in a direction that is orthogonal or at least includes a component orthogonal to the first rotational axis. Step 630 is then performed to collect a second set of height data from each of the three sensors. Again based on the known relative position of each sensor on the plate, the second set of height data can also be used to fit a second plane which also passes through substantially the same contact point.

As shown earlier in FIGS. 5A-5C, a single coordinate of the contact point A (or simply a distance from the contact point A to one sensor) can be deduced from two sets of height data. In general, the contact point has an arbitrary position on the plate defined by X-Y coordinates. Because there is an orthogonal component between the two tilting orientations and at least a third sensor is added outside the line connecting the first two sensors, the X-Y coordinates can be deduced based on the first set of height data and the second set of height data in conjunction with the known positions of each of the three sensors on the plate. In other words, the location of the object relative to the plate can be determined. For example, steps 635 and 640 of the method 600 are performed to deduce the relative location of the object.

After the location of the object is determined, the distance from the object to each of the three sensors can be calculated. Furthermore, step 645 is performed to calculate the height of the object using either the first set of the height data or the second set of height data in conjunction with the relative location of the object.

In an alternative embodiment, the present invention also provide a system for determining an object height on a surface. The system includes a height measurement apparatus. The apparatus includes a housing which has a first portion with an upper surface and a lower surface and an extension portion extending a first distance from the lower surface of the first portion. The extension portion defines a cavity opposing the lower surface of the first portion. The apparatus further includes one or more flexible members coupled to the extension portion and a plate having a top surface and a bottom surface. The plate is coupled to the one or more flexible members and disposed in the cavity to lie in a plane substantially parallel to the surface.

Although FIG. 6 illustrates a method of using two sets of data to determine the height of the object, other embodiments utilize more than two sets of data. The computation of object height may be performed iteratively, determining a difference between height calculations and repeating the computation based on additional data until a predetermined minimum acceptable difference is achieved. Thus, using techniques of minimization, multiple measurements may be combined in computing the single value of the object height.

For example, if you have three non-parallel planes, they will intersect at one point, so there is no minimization. But if you have more than three planes (due to multiple measurements), then you can typically improve the computed object height value by combining the information from each of the additional measurement sets. Combining the information can be done in various ways, depending on how the readings are related, but typically it works by assigning an error estimate to each measurement and then minimizing the overall error by weighting each reading to by the inverse of the estimated error for that reading.

The errors can be estimated in this case by looking at the angle of the plate for a particular measurement (which is related to how far off the top of the object the plate is rotated) and the differences in the angle for each of the three measurements (which is related to how parallel the planes are). The more parallel the planes are, the less precisely the exact location of intersection can be determined.

Additionally, the apparatus includes one or more actuators which are disposed to pass through the lower surface of the first portion of the housing into the cavity and are capable of engaging the top surface of the plate. The apparatus further includes a plurality of sensors disposed at predetermined positions of the plate. Each of the plurality of sensors is responsive to a height measured between each of the plurality of sensors and the surface. The system further includes a controller coupled to the height measurement apparatus and configured to send control signals to the one or more actuators and receive a plurality of height measurements from each of the plurality of sensors. Moreover, the system includes a computer coupled to the controller and configured to process the plurality of height measurements from each of the plurality of sensors and compute the object height on the surface.

Figure 7:
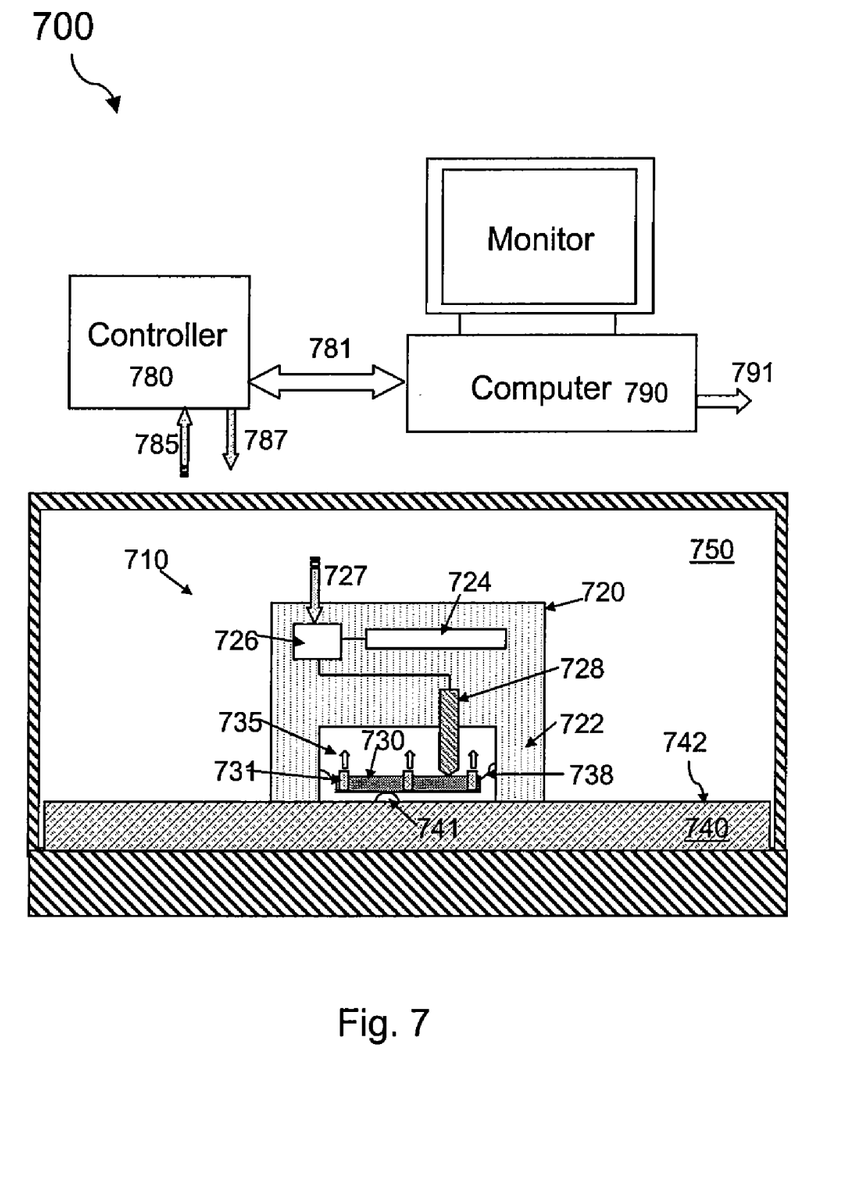
FIG. 7 is a simplified diagram illustrating a system for determining a height of an object on a surface according to an embodiment of the present invention.

FIG. 7 is a simplified diagram illustrating a system for determining a height of an object on a surface according to an embodiment of the present invention. This diagram is merely an illustration and should not limit the scope of the claims herein. As shown, the system 700 includes an apparatus 710 for measuring a height of an object on a surface, a controller 780 for sending control signals 787 to the apparatus 710 and receiving sensor data from the apparatus 710, and a computer 790 coupled to the controller for calculating the object height based on the received sensor data. In one embodiment, the apparatus 710 is placed on a surface 742 of a workpiece 740 inside a processing chamber 750 for measuring the height of one or more objects or protrusions 741 on the surface 742. For example, the workpiece 740 may be a vacuum chuck or an electrostatic chuck made from stainless steel, silicon carbide, copper, graphite, aluminum, aluminum nitride, aluminum oxide, boron nitride, combinations/laminations of these materials, or the like. The object or protrusion 741 is one of a number of proximity pins each having a certain height above the surface 742 and used to support a semiconductor substrate.

In one embodiment, the apparatus 710 further includes a housing 720 which has an extension portion 722 for supporting the housing on the surface 742. The extension portion 722 also creates a cavity between the housing 720 and the surface. In a specific embodiment, the apparatus 710 further includes a plate 730 adaptively disposed inside the cavity and supported by one or more flexible members 738. The one or more flexible members 738 are coupled to the inner side of the extension portion 722, which is stiff enough to hold the weight of the plate such that the plate 730, as in a free-suspension state, lies in a plane that is substantially parallel to the surface 742. The coupling positions of the one or more flexible members on the extension portion may be adjustable so that the lower surface is substantially flush with the surface 742. Of course, there can be other alternatives, variations, or modifications. For example, the housing 720 may not necessarily have any portion that makes contact with the surface 742. The housing 720 could be part of a robot arm so that the plate coupled to the housing can be operatively adjusted for engaging toward and making contact with one of a plurality of identified object on the surface 742.

In a specific embodiment, as shown in FIG. 7, the apparatus 710 is brought to a position on the surface 742 such that the plate 730 is able to make contact with the object 741. The plate further includes a plurality of height sensors 731 mounted at predetermined positions on the plate. Each of the plurality of sensors 731 is capable of sensing a height between the corresponding sensor and the surface 742 at a measurement position. The height sensor 731 can be any type of sensor capable of measuring spatial distance. For example, the sensor 731 may be a capacitive sensor. In another specific embodiment, the plurality of sensors 731 includes at least three sensors that are located on the plate forming a triangle configuration. In yet another embodiment, each of the plurality of sensors 731 includes a wireless transmitter capable of sending the height measurement data to the controller 780 using one or more wireless data packets 735.

In one embodiment, as shown in FIG. 7, the apparatus 710 further includes one or more actuators 728, which are installed above the plate 730 passing through a lower surface of the housing and extending down towards the top surface of the plate 730. The actuators 728 receive power from a power supply 724 within the housing 720 and are coupled to a wireless receiver 726 for receiving control signals 727 from the controller. For example, the received control signal 727 may be the control signal 787 sent by controller 780. In a specific embodiment, the one or more actuators 728 are made from a piezoelectric device, a MEMS device, an electromagnetic stepping motor, or the like, that is capable of performing at least a vertical motion based on the received control signal 727. The vertical motion causes the plate 730 to tilt by pushing one edge down while the plate 730 being lifted by the object 741 at another location of the plate. In another specific embodiment, the one or more actuators 728 are capable of causing the plate to tilt in first orientation and then tilt in a second orientation while the plate 730 maintains contact with the object 741 at substantially the same contact point, provided that the height of the object is substantially smaller than the dimension of the plate. The first orientation and the second orientation include at least an orthogonal component. For example, the plate first tilts in an east-west direction and then tilts in a north-south direction.

In a specific embodiment, the apparatus 710 is the apparatus 100 shown in FIG. 1 and the plate 720 is the plate 120 shown in FIGS. 1 and 2. In another specific embodiment, the method 600 would be applied to the apparatus 710 for obtaining the height of the object 741. Each time the plate is tilted in a particular orientation, a set of height data is collected from the plurality of sensors and sent to the controller 780. The controller 780 then transfers the data to the computer 790 where a computational code may be pre-installed and configured to process the data for determining the relative location of the object 741 and the height of the object 741. For example, the computational code installed in the computer 790 may be based on the method 600 illustrated in FIG. 6. Furthermore, the computer 790 can be coupled to a network through a communication port 791. The network could be a company internal network or the Internet.

While the present invention has been described with respect to particular embodiments and specific examples thereof, it should be understood that other embodiments may fall within the spirit and scope of the invention. The scope of the invention should, therefore, be determined with reference to the appended claims along with their full scope of equivalents.

What is claimed is:

1. An apparatus for measuring a height of an object above a surface of a work piece, the apparatus comprising:
a housing including:
a first portion having an upper surface and a lower surface; and
an extension portion extending a first distance from the lower surface of the first portion, whereby the extension portion defines a cavity opposing the lower surface of the first portion;
one or more actuators passing through the lower surface of the first portion of the housing and extending into the cavity;
one or more flexible members coupled to the extension portion;
a plate having a top surface and a bottom surface, the plate being coupled to the one or more flexible members and disposed in the cavity, wherein the plate is supported by the one or more flexible members to lie in a plane substantially parallel to the surface of the work piece; and
a plurality of sensors disposed at predetermined positions of the plate, wherein each of the plurality of sensors is responsive to a height measured between each of the plurality of sensors and the surface of the work piece.

2. The apparatus of claim 1 wherein the plurality of sensors comprise at least three sensors positioned with a predetermined distance between each of the three sensors.

3. The apparatus of claim 2 wherein each of the three sensors are disposed in a peripheral portion of the plate to form a triangle.

4. The apparatus of claim 3 wherein the peripheral portion of the plate is spatially separated from the extension portion by a predetermined distance, thereby providing for vertical movement of the peripheral portion of the plate in response to contact with the one or more actuators.

5. The apparatus of claim 1 wherein the extension portion extends from a peripheral portion of the housing.

6. The apparatus of claim 1 wherein the plate comprises a silicon carbide material.

7. The apparatus of claim 1 wherein one or more of the plurality of sensors comprises a capacitive sensor.

8. The apparatus of claim 1 wherein the housing further comprises:
 a power supply coupled to the one or more actuators; and
 a wireless receiver coupled to the power supply.

9. The apparatus of claim 1 wherein each of the plurality of sensors comprises a wireless transmitter configured to send measured height data to a remote controller.

10. A system for determining an object height on a surface of a work piece, the system comprising:
 a height measurement apparatus comprising:
 a housing including:
 a first portion having an upper surface and a lower surface; and an extension portion extending a first distance from the lower surface of the first portion, whereby the extension portion defines a cavity opposing the lower surface of the first portion;
 one or more flexible members coupled to the extension portion;
 a plate having a top surface and a bottom surface, the plate being coupled to the one or more flexible members and disposed in the cavity to lie in a plane substantially parallel to the surface of the work piece;
 one or more actuators disposed passing through the lower surface of the first portion of the housing into the cavity and capable of engaging the top surface of the plate; and
 a plurality of sensors disposed at predetermined positions of the plate, wherein each of the plurality of sensors is responsive to a height measured between each of the plurality of sensors and the surface of the work piece;
 a controller coupled to the height measurement apparatus and configured to send control signals to the one or more actuators and receive a plurality of height measurements from each of the plurality of sensors; and
 a computer coupled to the controller and configured to process the plurality of height measurements from each of the plurality of sensors and compute the object height on the surface of the work piece.

11. The system of claim 10 wherein the extension portion of the housing is configured to have one or more adjustable supports.

12. The system of claim 10 wherein the one or more flexible members comprises a diaphragm, a rubber material, or a spring member.

13. The system of claim 10 wherein the plurality of sensors includes at least three sensors, each of the three sensors disposed in a peripheral portion of the plate and forming a triangle.

14. The system of claim 10 wherein each of the plurality of sensors further comprises a capacitive sensor.

15. A method of determining a height of an object on a surface, the method comprising:
 identifying an object on the surface;
 engaging a plate to make contact between a lower surface of the plate and the object, wherein:
 the plate is supported by one or more flexible members to lie in a plane substantially parallel to the surface, the one or more flexible members being coupled to a housing; and
 the plate includes a plurality of sensors disposed at predetermined positions, each of the plurality of sensors being responsive to a height measured between the each of the plurality of the sensors and the surface;
 tilting the plate relative to a first rotational axis while maintaining contact between the lower surface and the object;
 collecting a first plurality of height data;
 tilting the plate relative to a second rotational axis while maintaining contact between the lower surface and the object, wherein the second rotational axis includes at least a component orthogonal to the first rotational axis;
 collecting a second plurality of height data;
 processing an information associated with the first plurality of height data and the second plurality of height data in conjunction with the predetermined positions of the plurality of sensors;
 determining a location of the object relative to the plate; and
 calculating the height of the object based on at least the location of the object and at least the first plurality of height data.

16. The method of claim 15 wherein the housing has an extension portion to make contact with the surface before engaging the plate to make contact with the object.

17. The method of claim 15 wherein the housing is configured to move laterally for one by one measuring multiple objects on the surface.

18. The method of claim 15 further comprising calculating the height of the object based on at least the location of the object and at least the second plurality of height data.

19. The method of claim 15 wherein the plurality of sensors includes at least three sensors, each of the at least three sensors disposed in a peripheral portion of the plate with a predetermined distance between each other to form a triangle.

20. The method of claim 19 wherein the predetermined distance is substantially larger than the height of the object.

21. The method of claim 19 wherein the first plurality of height data includes measurements from the at least three sensors in a first measurement position.

22. The method of claim 19 wherein the second plurality of height data includes measurements from the at least three sensors in a second measurement position.

23. The method of claim 15 wherein tilting the plate relative to a first rotational axis comprises using one or more actuators to push the plate towards the surface so that at least one edge of the plate makes contact with the surface.

24. The method of claim 15 wherein tilting the plate relative to a second rotational axis comprises using one or more actuators to push the plate towards the surface so that at least one edge of the plate makes contact with the surface.

* * * * *